(12) United States Patent
Sheehan

(10) Patent No.: US 6,593,431 B2
(45) Date of Patent: Jul. 15, 2003

(54) PURIFICATION MEANS

(75) Inventor: Michael T. Sheehan, Corpus Christi, TX (US)

(73) Assignee: ChemFirst Electronic Materials LP, Dallas, TX (US)

( * ) Notice: Subject to any disclaimer, the term of this patent is extended or adjusted under 35 U.S.C. 154(b) by 0 days.

(21) Appl. No.: 10/126,287

(22) Filed: Apr. 19, 2002

(65) Prior Publication Data

US 2002/0156233 A1 Oct. 24, 2002

Related U.S. Application Data

(63) Continuation-in-part of application No. 09/604,140, filed on Jun. 27, 2000, now abandoned.

(51) Int. Cl.$^7$ .............................. C08F 6/04; C08F 6/06; C08F 6/08; C08F 6/10; C08F 6/12
(52) U.S. Cl. .............................. 525/327.4; 525/327.7; 525/328.9; 525/329.5; 525/330.1; 525/330.3; 525/330.6; 525/331.5; 525/333.3; 528/482; 528/495; 528/496; 528/503
(58) Field of Search ................... 528/496, 503, 528/482, 495; 525/329.5, 333.3, 327.4, 327.7, 328.9, 330.1, 330.3, 330.6, 331.5

(56) References Cited

U.S. PATENT DOCUMENTS

| | | | | |
|---|---|---|---|---|
| 3,987,235 A | * | 10/1976 | Fujimoto | 528/481 |
| 4,195,169 A | * | 3/1980 | Priddy | 528/500 |
| 4,491,628 A | | 1/1985 | Ito et al. | 430/176 |
| 4,636,540 A | | 1/1987 | Warfel | 523/310 |
| 4,678,843 A | | 7/1987 | Elmore et al. | 525/378 |
| 4,689,371 A | | 8/1987 | Elmore et al. | 525/374 |
| 4,822,862 A | | 4/1989 | Rupp et al. | 525/367 |
| 4,877,843 A | | 10/1989 | Gupta | 525/344 |
| 4,898,916 A | | 2/1990 | Gupta | 525/344 |
| 4,912,173 A | | 3/1990 | Keene et al. | 525/378 |
| 4,931,379 A | | 6/1990 | Brunsvold et al. | 430/270 |
| 4,939,070 A | | 7/1990 | Brunsvold et al. | 430/312 |
| 4,962,147 A | | 10/1990 | Vicari | 524/460 |
| 5,087,772 A | | 2/1992 | Sheehan et al. | 568/804 |
| 5,239,015 A | | 8/1993 | Sheehan et al. | 525/344 |
| 5,304,610 A | | 4/1994 | Bhattacharya et al. | 525/327.1 |
| 5,625,007 A | | 4/1997 | Sheehan et al. | 525/328.8 |
| 5,625,020 A | | 4/1997 | Breyta et al. | 526/329.2 |
| 5,708,133 A | * | 1/1998 | Higuchi et al. | 528/496 |
| 5,789,522 A | | 8/1998 | Zampini et al. | 528/129 |
| 5,919,597 A | | 7/1999 | Sinta et al. | 430/270 |
| 5,939,511 A | | 8/1999 | Zampini et al. | 528/143 |
| 5,945,251 A | | 8/1999 | Davidson | 430/270.1 |
| 6,414,110 B1 | * | 7/2002 | Sheehan et al. | 528/495 |

FOREIGN PATENT DOCUMENTS

| | | |
|---|---|---|
| EP | 260 104 A | 3/1988 |
| EP | 277 721 A | 10/1988 |
| EP | 544 324 B | 6/1993 |
| EP | 605 089 B | 7/1994 |
| EP | 813 113 A | 12/1997 |
| WO | WO 94/14858 A | 7/1994 |

* cited by examiner

Primary Examiner—Rabon Sergent
(74) Attorney, Agent, or Firm—James J. Mullen

(57) ABSTRACT

Polymers derived from 4-acyloxystyrene are purified by fractionalization plus heating and cooling of the polymers in alcoholic solvents.

10 Claims, No Drawings

PURIFICATION MEANS

RELATED APPLICATION

The present application is a continuation-in-part of and is related by common assignee to Ser. No. 09/604,140 filed Jun. 27, 2000 now abandoned.

BACKGROUND OF THE INVENTION

Copolymers and terpolymers, when isolated from reaction solution are a mixture of compounds of varying composition and molecular weight. Typically they contain small quantities of starting material and by-products which are undesirable in the final polymer. The polymer mixture is precipitated from the solvent or solvent mixture by adding the mixture to a second solvent, as for example water, hexane, heptane, octane, petroleum ether, or a mixture thereof. The polymer is then dried under a nitrogen atmosphere. The subject of this invention pertains to a method of purifying the polymer.

Davidson, in U.S. Pat. No. 5,945,251, discloses a method of purifying polyhydroxystyrene polymers by adding an amine, a hydrophilic solvent, a hydrophobic solvent, and water to the polymer; separating the aqueous phase; then removing the hydrophilic solvent and the hydrophobic solvent to form the purified polymer.

Zempini, et al. in U.S. Pat. Nos. 5,789,522 and 5,939,511, extracts impurities from a phenolic resin by dissolving the resin in a photoresist solvent and extracting the water-soluble impurities therefrom.

SUMMARY OF THE DISCLOSURE

The present invention provides a novel process for improving the glass transition temperatures and reducing the polydispersity values of polymer intermediates that have been polymerized by precipitation from methanol. The polymers that are susceptible to treatment with the method of this invention are polymers of 4-acyloxystyrene. The 4-acyloxystyrene derived polymers are then transesterified to 4-hydroxyphenyl-containing polymers useful in paints, resins, thickening agents, and in photoresist compositions. The present invention process is an improvement over the prior art and is quite efficient. Specifically the invention provides a method of removing unreacted monomers, low molecular weight polymers, and the like from the crude polymer mixture before the transesterification step. Many analytical methods can be utilized to quantify the improvement in the purity of polymers. Average molecular weight, nuclear magnetic resonance, chromatography, and glass transition temperature are all effective in certain instances with certain molecules and characteristic side chains.

As previously described in the prior art, the crude polymer after polymerization is separated from the alcohol by filtration, centrifugation, decantation, or the like. According to the method of this invention, the polymer is subject to fractionalization whereby it is suspended in methanol and the solid is separated from the methanol. This procedure is repeated as long as necessary to remove by-products and low molecular weight materials that are more soluble in the methanol than the desired polymer. In this manner, the undesirable monomeric impurities and oligomers are soluble in the solvent (such as methanol) depending upon temperature and thus are removed during each fractionation step.

DETAILED DESCRIPTION OF THE INVENTION

This invention provides a process for the improvement in the composition of polymers derived from the monomer I,

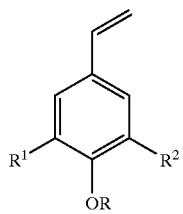

wherein R is either —C(O)R$^5$ or —R$^5$; as a homopolymer and/or typically with one or more of the following monomers: an acrylate monomer having the formula II,

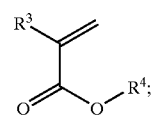

and/or with one or more ethylenically unsaturated copolymerizable monomers (EUCM) selected from the group consisting of styrene, 4-methylstyrene, styrene alkoxide wherein the alkyl portion is $C_1$–$C_5$ straight or branch chain, tert.-butylstyrene, cyclohexyl acrylate, tert.-butyl acrylate, tert.-butyl methacrylate, maleic anhydride, dialkyl maleate, dialkyl fumarate and vinyl chloride. wherein:

i) R$^1$ and R$^2$ are the same or different and independently selected from the group consisting of:
  hydrogen;
  fluorine, chlorine or bromine;
  alkyl or fluoroalkyl group having the formula $C_nH_xF_y$ where n is an integer from 1 to 4, x and y are integers from 0 to 2n+1, and the sum of x and y is 2n+1; and
  phenyl or tolyl;

ii) R$^3$ is selected from the group consisting of:
  hydrogen; and
  methyl, ethyl, n-propyl, iso-propyl, n-butyl, iso-butyl or tert.-butyl;

iii) R$^4$ is methyl, ethyl, n-propyl, iso-propyl or tert.-butyl; and iv) R$^5$ is $C_1$–$C_4$ alkyl, typically manufactured by subjecting a monomer of formula I,

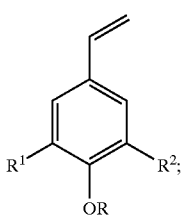

or a monomer of the formula I and/or monomer II, and/or one or more of said copolymerizable monomers (EUCM) to suitable polymerization conditions in an alcoholic solvent and in the presence of a free radical initiator at suitable temperature for a sufficient period of time to produce a crude polymer of corresponding composition. After purification by the method of this invention, the purified polymer is transesterified to a polymer containing the monomer of formula III:

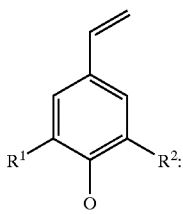

by (1) subjecting said polymer to transesterification conditions in said alcoholic solvent in the presence of catalytic amounts of a base catalyst at suitable temperature such that the transesterified by-product ester formed is continuously removed from the reaction mixture to form the homopolymer of I or the copolymer of I, and/or II, and/or said copolymerizable monomer, (EUCM) or (2) subjecting the polymer to acidic hydrolysis with a strong acid. The polymer is then optionally passed through an ion-exchange bed to remove said base or acid catalyst;

The polymerization, purification, and/or transesterification steps are carried out on an anhydrous basis (i.e. <about 5,000 ppm water). The alcoholic solvent for the polymerization is an alcohol having 1 to 4 carbon atoms and is selected from the group consisting of methanol, ethanol, propanol, isopropanol, t-butanol, and combinations thereof. The amount of solvent used is not critical and can be any amount which accomplishes the desired end result.

The free radical initiator for the polymerization may be any initiator that achieves the desired end result. The initiator may be selected from the group consisting of 2,2'-azobis(2,4-dimethylpentanenitrile), 2,2'-azobis(2-methylpropanenitrile), 2,2'-azobis(2-methylbutanenitrile), 1,1'-azobis(cyclohexanecarbonitrile), t-butyl peroxy-2-ethylhexanoate, t-butyl peroxypivalate, t-amyl peroxypivalate, diisononanoyl peroxide, decanoyl peroxide, succinic acid peroxide, di(n-propyl) peroxydicarbonate, di(sec-butyl) peroxydicarbonate, di(2-ethylhexyl) peroxydicarbonate, t-butylperoxyneodecanoate, 2,5-dimethyl-2,5-di(2-ethylhexanoylperoxy)hexane, t-amylperoxyneodecanoate, dimethyl 2,2'-azobisisobutyrate, and combinations thereof.

The initiator is typically selected from the group consisting of 2,2'-azobis(2,4-dimethylpentanenitrile), 2,2'-azobis(2-methylpropanenitrile), 2,2'-azobis(2-methylbutanenitrile), 1,1'-azobis(cyclohexanecarbonitrile), t-butyl peroxy-2-ethylhexanoate, t-butyl peroxypivalate, t-amyl peroxypivalate, and combinations thereof.

The polymerization conditions are not critical and can be any temperature and pressure that will produce the desired end result. In general, the temperatures are from about 30° C. to about 100° C., preferably from about 40° C. to about 100° C., and most preferably from about 45° C. to about 90° C. The pressure may be atmospheric, sub-atmospheric or super-atmospheric. The polymerization time is not critical, but generally will take place over a period of at least one minute in order to produce a polymer of corresponding composition.

After the polymerization step and prior to the transesterification step, the crude polymer is subjected to a purification procedure wherein the same type carboxylic alcoholic solvent (first solvent) is used to purify the crude polymer via a multi-step fractionation process. Additional first solvent is added to the crude polymer mixture, and the resultant slurry is stirred vigorously and/or heated to boiling (about 66° C.) for several minutes, and then chilled to as low as 25° C. and allowed to stand. This permits the slurry to produce a phase separation, and then the liquid is removed by centrifugation, filtration, decantation or by similar means. The process is repeated at least one more time until no further purification is identified, as for example, until a small sample of the decanted solvent, upon evaporation to dryness shows substantially no residue. This fractionation process is generally carried out 2 to 10 times, i.e. heating, cooling, separating, and the solvent replacement.

One of the important measures of the degree of impurity of the crude polymer produced from the polymerization of the monomers is the polydispersity value. In general, it is desirable to have a low value, for example, less than about 3; the lower value is indicative that the polymerization reaction was more uniform in chain length. The uniqueness of this purification step is that the desired polymer formed is to some degree not soluble in the solvent and that the undesired, low molecular weight average polymers and undesired monomers are soluble in the solvent. Thus the novel purification/fractionalization step, provides the removal of these undesirable materials. In general the polydispersity of the crude polymer is measured before, during and after this purification/fractionalization step, with the objective of reducing this value by at least about 10% of what the value of the original crude polymer was before the purification treatment. Preferably it is desirable to yield a product whose polydispersity is below about 2.0. It is to be understood that polydispersity means the ratio of weight average molecular weight (Mw) over the number average molecular weight (Mn) as determined by Gel Permeation Chromatography (GPC).

In the transesterification step, the purified polymer from the polymerization step is subjected to said transesterification conditions in an alcoholic solvent in the presence of catalytic amounts of a base catalyst. The base catalyst is such that it will not substantially react with said alkyl acrylate monomer II, or with said co-polymerizable monomers (EUCM). The base catalyst is either an alkalic metal hydroxide or an alkalic metal alkoxide. The base catalyst is selected from the group consisting of lithium hydroxide, lithium methoxide, lithium ethoxide, lithium isopropoxide, sodium hydroxide, sodium methoxide, sodium ethoxide, sodium isopropoxide, potassium hydroxide, potassium methoxide, potassium ethoxide, potassium isopropoxide, cesium hydroxide, cesium methoxide, cesium ethoxide, cesium isopropoxide, and combinations thereof.

If a hydrolysis is utilized to effect removal of the phenol blocking group, the acid should be a member of the strong acids, as for example hydrochloric acid, hydrobromic acid, sulfuric acid, or the like.

Thus and according to the method of this invention, after polymerization of the acyloxy-derived polymer, and prior to the transesterification the crude polymer is subjected to this novel fractionation process which provides a substantially purified polymer which then can be further treated.

This invention is further illustrated by the following examples that are provided for illustration purposes and in no way limits the scope of the present invention.

EXAMPLES (GENERAL)

In the Examples that follow, the following abbreviations are used:

ASM—p-Acetoxystyrene monomer t-BPP—tert-butyl peroxypivalate

THF—Tetrahydrofuran

GPC—Gel permeation chromatography

GC—Gas chromatography

FTIR—Fourier transform infrared spectroscopy

NMR—Nuclear magnetic resonance spectroscopy, usually of either proton, $^1H$;

and/or carbon 13, $^{13}$C nuclei.

DSC—Differential scanning calorimetry

UV-Vis—Ultraviolet-Visible Spectroscopy

General Analytical Techniques Used for the Characterization: A variety of analytical techniques were used to characterize the co- and terpolymers of the present invention that included the following:

NMR: $^1$H and $^{13}$C NMR spectra were recorded on a Bruker 400 MHz spectrometer with 5 mm probes at 400 and 100 MHz, respectively.

GPC: GPC was performed on a Waters gel permeation chromatograph equipped with refractive index detection.

GC: GC analysis was performed on a Hewlett Packard Model 5890 series II gas chromatograph equipped with a DB-1 column.

FTIR: FTIR was recorded on a Mattson Genesis Series FTIR.

DSC: A Perkin Elmer 7700 DSC was used to determine the $T_g$ (glass transition temperature) of the co- and terpolymers of this invention. The heating rate was maintained at 10° C./minute, generally, over a temperature range of 50° C. to 400° C. The flow rate of nitrogen or air is maintained at 20 mL/min.

UV-Vis of samples were taken using a Hewlett Packard Vectra 486/33VL UV-Vis spectrophotometer.

Example 1

Poly(4-hydroxystyrene) in propyleneglycolmonomethyl ether acetate

To a four neck 12 liter flask, fitted with a mechanical stirrer, condenser, nitrogen inlet and thermowell, 4-acetoxystyrene (2752.3 g, 16.97 moles), and methanol (3075.0 g) were added. The flask was purged with nitrogen and then heated to reflux (66° C.) over a period of one hour. Then, 2,2'-azobis(2,4-dimethylvaleronitrile) (146.0 g, 0.59 moles) was added to the hot reactor as a slurry in methanol (250 g). The reactor was heated at reflux for 2 hours and then an additional charge of 2,2'-azobis(2,4-dimethylvaleronitrile) (24.3 g, 0.1 moles) was done. The reactor was heated for an additional 6 hours and then was cooled to room temperature.

The solids were extract by successive replacements of the solvent as follows. The reactor was heated to 60° C. with stirring. The heat was removed and the reactor was allowed to cool without stirring to 44.3° C. The top layer (899 g) of solvent was removed by suction and was replaced with methanol (1495 g). The reactor was again heated to 60° C. and cooled to 41.9° C. without stirring. The top layer (1700 g) was again removed by suction and was replaced with methanol (1705 g). The reactor was again heated to 60° C. and cooled to 46.2° C. without stirring. The top layer (1633 g) was again removed by suction and was replaced with methanol (1765 g). The reactor was again heated to 60° C. and cooled to 45.0° C. without stirring. The top layer (1905 g) was again removed by suction and was replaced with methanol (1955 g). The reactor was again heated to 60° C. and cooled to 46.0° C. without stirring. The top layer (2145 g) was again removed by suction and was replaced with methanol (2215 g). The reactor was again heated to 60° C. and cooled to 46.0° C. without stirring. The top layer (2241 g) was again removed by suction and was replaced with methanol (1700 g). All of the solids during each extraction were analyzed for molecular weight by GPC, table I. The reactor was then cooled to room temperature.

The purified poly(4-acetoxystyrene) was converted to poly(4-hydroxystyrene) as follows. The reactor was fitted with a Dean Stark trap and condenser. A solution of 25.0 weight percent of Sodium methoxide in methanol (64.24 g, 0.30 moles) was added to the reactor. The reactor was then heated to reflux (64° C.). The overhead distillate was removed and replaced with methanol with equal weight. The reactor was heated at reflux for 7.5 hours. The reactor was then cooled to room temperature. This solution was then passed through a column of Amberlyst A15 (2"×16") at 40 mL/min at room temperature to remove metal contamination.

The solvent was exchanged from methanol to propyleneglycolmonomethyl ether acetate (PGMEA) as follows. The solution was added to a 4 neck, 12 liter flask fitted with a distillation head and receiver, thermowell, mechanical stirrer, and nitrogen inlet. The reactor was heated to 25° C. to 48° C. under vacuum (120 torr to 10 torr) to remove methanol. To the reactor, a total of 4975 g PGMEA was added as the methanol was removed. The amount of solids present was determined by density and the solution was adjusted to 35.0 weight percent with PGMEA. An overall yield of 1634 g of polymer (81.7% theoretical yield) was obtained.

Example 2

Poly(4-hydroxystyrene) in propyleneglycolmonomethyl ether acetate

To a four neck 12 liter flask, fitted with a mechanical stirrer, condenser, nitrogen inlet and thermowell, 4-acetoxystyrene (2752.3 g, 16.97 moles), and methanol (3081.0 g) were added. The flask was purged with nitrogen and then heated to reflux (66° C.) over a period of one hour. Then, 2,2'-azobis(2,4-dimethylvaleronitrile) (146.1 g, 0,59 moles) was added to the hot reactor as a slurry in methanol (250 g). The reactor was heated at reflux for 2 hours and then an additional charge of 2,2'-azobis(2,4-dimethylvaleronitrile) (24.4 g, 0.01 moles) was done. The reactor was heated for an additional 6 hours and then was cooled to room temperature.

The solids were extracted by successive replacements of the solvent as follows. The reactor was heated to 60° C. with stirring. The heat was removed and the reactor was allowed to cool without stirring to 45.0° C. The top layer (1129 g) of solvent was removed by suction and was replaced with methanol (1817 g). The reactor was again heated to 60° C. and cooled to 47.0° C. without stirring. The top layer (1627 g) was again removed by suction and was replaced with methanol (1624 g). The reactor was again heated to 60° C. and cooled to 44.0° C. without stirring. The top layer (1668 g) was again removed by suction and was replaced with methanol (1613 g). The reactor was again heated to 60° C. and cooled to 47.0° C. without stirring. The top layer (1514 g) was again removed by suction and was replaced with methanol (1745 g). The reactor was again heated to 60° C. and cooled to 45.0° C. without stirring. The top layer (1822 g) was again removed by suction and was replaced with methanol (2288 g). The reactor was again heated to 60° C. and cooled to 43.0° C. without stirring. The top layer (22471 g) was again removed by suction and was replaced with methanol (1607 g). All of the solids during each extraction were analyzed for molecular weight by GPC, table 1. The reactor was then cooled to room temperature.

The purified poly(4-acetoxystyrene) was converted to poly(4-hydroxystyrene) as follows. The reactor was fitted with a Dean Stark trap and condenser. A solution of 25.0 weight percent of Sodium methoxide in methanol (64.24 g, 0.30 moles) was added to the reactor. The reactor was then heated to reflux (64° C.). The overhead distillate was removed and replaced with methanol with equal weight. The reactor was heated at reflux for 7.5 hours. The reactor was then cooled to room temperature. This solution was then passed through a column of Amberlyst A15 (2×"16") at 40 mL/min at room temperature to remove metal contamination.

The solvent was exchanged from methanol to propyleneglycolmonomethyl ether acetate (PGMEA) as follows. The solution was added to a 4 neck, 12 liter flask fitted with a distillation head and receiver, thermowell, mechanical stirrer, and nitrogen inlet. The reactor was heated to 25° C. to 48° C. under vacuum (120 torr to 10 torr) to remove methanol. To the reactor, a total of 4000 g PGMEA was added as the methanol was removed. The amount of solids present was determined by density and the solution was adjusted to 35.0 weight percent with PGMEA. An overall yield of 1708 g of polymer (85.4% theoretical yield) was obtained.

which was pretreated with PGMEA was added to the reaction mixture and stirred for 2 hours at 23° C. The resin was removed by filtration and 1.14 kg, 36.6 wt % poly (hydroxystyrene-co-t-butoxycarbonyloxystyrene) copolymer solution was obtained. The characterization of the copolymer and the ratio determination were done by NMR. Hydroxystyrene/t-butoxycarbonyloxystyrene ratio was determined to be 82/18, molecular weight was determined by GPC to be Mw=11,711 with polydispersity 1.67.

Example 5

The following example illustrates the use of the method of this invention on the purification of a copolymer of 4-acetoxystyrene/tert.-butyl acrylate. 3282.8 g 4-acetoxystyrene, and 254 g tert-butyl acrylate is polymerized in 3140 g methanol using 204.3 g tert-butyl peroxypiv-

TABLE 1

Molecular weight analysis of poly(4-acetoxystyrene) purification by extraction.

| | Example 1 | | | Example 2 | | |
|---|---|---|---|---|---|---|
| Sample | Weight average Molecular Weight | Number average Molecular Weight | Polydispersity | Weight average Molecular Weight | Number average Molecular Weight | Polydispersity |
| Original solid | 9,556 | 5,083 | 1.88 | 8,866 | 4,501 | 1.97 |
| 1st extraction | 9,845 | 5,594 | 1.76 | 9,830 | 5,093 | 1.93 |
| 2nd extraction | 10,009 | 5,888 | 1.70 | 10,049 | 5,742 | 1.75 |
| 3rd extraction | 10,371 | 6,285 | 1.65 | 10,112 | 5,879 | 1.72 |
| 4th extraction | 9,921 | 6,162 | 1.61 | 10,327 | 5,969 | 1.73 |
| 5th extraction | 10,362 | 6,476 | 1.60 | 9,394 | 5,559 | 1.69 |

Example 3

Poly (hydroxystyrene-co-ethoxyethoxystyrene)

To a 3L 4 neck round bottom flask containing 1.30 kg, 34.5 wt % polyhydroxystyrene solution in PGMEA, camphoresulphonic acid, 400 mg was added under nitrogen atmosphere and the mixture was stirred at 23° C. for 2 hours for homogeneity. The solution was then cooled to 5° C. and 127 g, ethylvinylether was added drop wise with stirring under nitrogen at the reaction temperature between 5° C. to 10° C. (2 hours). After the addition, the mixture was stirred for additional 6 hours at 5° C. Amberlyst A-21, 33 g which was pretreated with PGMEA was added to the reaction mixture and stirred for 2 hours at 25° C. The resin was removed by filtration and 1.43 kg, 39.3% poly (hydroxystyrene-co-ethoxyethoxystyrene) copolymer solution was obtained. The characterization of the copolymer and the ratio determination were done by NMR. Hydroxystyrene/ethoxyethoxy-styrene ratio was determined to be 60/40, molecular weight was determined by GPC (polystyrene standard) to be Mw=10,819 with the polydispersity 1.77.

Example 4

Poly (hydroxystyrene-co-t-butoxycarbonyloxystyrene)

To a 2 L round bottom flaks containing 1.03 kg, 35.1 wtl % polyhydroxystyrene solution in PGMEA, p-dimethlyaminopyridine, 0.72 g in 11 g PGMEA was added under nitrogen and the mixture was stirred at 23° C. for one hour. Di-t-butyl dicarbonate, 124.4 g was added to the solution at 23° C. and stirred under nitrogen for 6 hours at 23° C. Vacuum was applied to the solution at 20 mmHg with stirring for 1 hour at 23° C. for removal of carbon dioxide formed as a by-product in the solution. Dowex Mac-3, 30 g alate as a catalyst. A sample of the polymer is isolated for analytical purposes. After polymerization was complete, 1390 g of methanol was removed at 58° C. and replaced with 1392 g of fresh methanol. The slurry was heated to reflux and cooled to 48° C. Another 1595 g of methanol was removed and replaced with 1590 g of fresh methanol. Again the slurry was heated to reflux and cooled. The methanol was removed and replaced with 1800 g of fresh methanol and the mixture was then transesterified with 39.8 g sodium methoxide. The polydispersity value of the purified polymer is 12% lower than the value of the crude polymer.

While specific reaction conditions, reactants, and equipment are described above to enable one skilled in the art to practice the invention, one skilled in the art will be able to make modifications and adjustments which are obvious extensions of the present inventions. Such obvious extensions of or equivalents to the present invention are intended to be within the scope of the present invention, as demonstrated by the claims which follow.

What is claimed is:

1. A method of purifying crude polymers derived from acyloxystyrene of the group consisting of

I

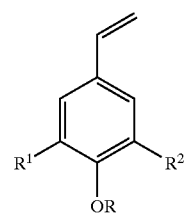

wherein R is either —C(O)$R^5$ or —$R^5$;
as a homopolymer or a copolymer with one or more of the following monomers:
an acrylate monomer having the formula II,

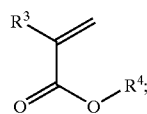

and/or with one or more ethylenically unsaturated copolymerizable monomers taken from the group consisting of styrene, 4-methylstyrene, styrene alkoxide wherein the alkyl portion is $C_1$–$C_5$ straight or branch chain, tert.-butylstyrene, cyclohexyl acrylate, tert.-butyl acrylate, tert.-butyl methacrylate, maleic anhydride, dialkyl maleate, dialkyl fumarate and vinyl chloride, wherein:

i) $R^1$ and $R^2$ are the same or different and independently selected from the group consisting of:
  hydrogen,
  fluorine, chlorine, bromine,
  alkyl and fluoroalkyl group having the formula $C_nH_xF_y$ where n is an integer from 1 to 4, x and y are integers from 0 to 2n+1, and the sum of x and y is 2n+1, phenyl, and tolyl;

ii) $R^3$ selected from the group consisting of:
  hydrogen;
  methyl, ethyl, n-propyl, iso-propyl, n-butyl, iso-butyl, and tert.-butyl;

iii) $R^4$ is methyl, ethyl, n-propyl, iso-propyl and tert.-butyl; and iv) $R^5$ is $C_1$–$C_4$ alkyl consisting essentially of subjecting said crude polymer, after polymerization thereof, to a fractionalization procedure wherein said crude polymer in an alcoholic solvent is (a) suspended therein and additional solvent is added, (b), heated and/or stirred for a sufficient period of time to permit dissolution of the undesirable monomeric impurities and oligomers in said crude polymer, (e) cooling the resultant mixture, (d) separating the alcoholic solvent from said polymer and (c) repeating said steps (a)–(d) until the polydespersity value of the purified polymer is about 10% less that that polydespersity value of the crude polymer.

2. The process as set forth in claim 1 wherein the solvent is selected from the group consisting of methanol, ethanol, propanol, isopropanol, t-butanol and mixtures thereof.

3. The process as set forth in claim 1 wherein the acyloxystyrene is acetoxystyrene monomer and is the only monomer used.

4. The process as set forth in claim 3 wherein the acetoxystyrene polymer in purified form has a polydispersity value of less than 2.0.

5. The process as set forth in claim 4 wherein the solvent is methanol.

6. The process as set forth in claim 1 wherein after said polymerization and fractionalization, there is an additional step of transesterification of the purified polymer which is conducted by adding additional alcoholic solvent and in the presence of catalytic amounts of a catalyst.

7. The process as set forth in claim 6 wherein after the transesterification step, there is an additional step of removing the catalyst from the reaction mixture of the transesterified product in said alcoholic solvent by passing said mixture through an ion-exchange bed in order to remove said catalyst therefrom.

8. The process as set forth in claim 7 wherein the entire process is conducted on an anhydrous basis.

9. The process as set forth in claim 8 wherein in step (e) the fractionalization is conducted from about 2 to about 10 times.

10. The process as set forth in claim 9 wherein after the catalyst removal step, there is an additional step wherein said alcoholic solvent is removed and replaced by a photoresist compatible solvent.

* * * * *